United States Patent
Sato

[11] Patent Number: 4,855,095
[45] Date of Patent: Aug. 8, 1989

[54] METHOD FOR INJECTION COMPRESSION MOLDING

[75] Inventor: Kazuhito Sato, Gotenba, Japan

[73] Assignee: Toshiba Kikai Kabushiki Kaisha, Tokyo, Japan

[21] Appl. No.: 140,145

[22] Filed: Dec. 29, 1987

[51] Int. Cl.⁴ .......................................... B29C 45/80
[52] U.S. Cl. ........................... 264/40.5; 264/40.7; 264/328.13; 425/145; 425/150
[58] Field of Search ............ 264/40.1, 40.5, 40.7, 264/294, 328.1, 328.7, 328.13; 425/145, 147, 149, 150

[56] References Cited

U.S. PATENT DOCUMENTS

| | | | |
|---|---|---|---|
| 3,773,451 | 11/1973 | Bielfeldt et al. | 425/147 |
| 3,857,658 | 12/1974 | Muzsnay | 425/145 |
| 4,135,873 | 1/1976 | Sone et al. | 425/147 |
| 4,489,033 | 12/1984 | Uda et al. | 264/328.7 |
| 4,707,321 | 11/1987 | Segawa et al. | 264/294 |
| 4,718,841 | 1/1988 | Kiya | 264/40.5 |

Primary Examiner—Jan H. Silbaugh
Assistant Examiner—Jill L. Heitbrink
Attorney, Agent, or Firm—Koda & Androlia

[57] ABSTRACT

In a method of operating an injection compression molding machine having a stationary metal mold, a movable metal mold, an oil pressure actuator for advancing the movable metal mold toward the stationary metal mold to form a mold cavity therebetween with a predetermined compression clearance δ left between the movable and stationary metal molds, a heating cylinder adapted to engage with the stationary metal mold, a hopper for supplying a thermoplastic resin into the heating cylinder, a screw contained in the heating cylinder for injecting molten metal into the mold cavity, an oil pressure motor for rotating the screw and a piston cylinder unit for reciprocating the screw through the heating cylinder, the molten resin is filled in the mold cavity by advancing the screw and the advancement of the movable metal mold is started when the screw reaches a predetermined set position during an injection stroke so as to reduce the compression clearance δ and to increase the pressure acting upon the molten resin injected into the mold cavity.

6 Claims, 1 Drawing Sheet

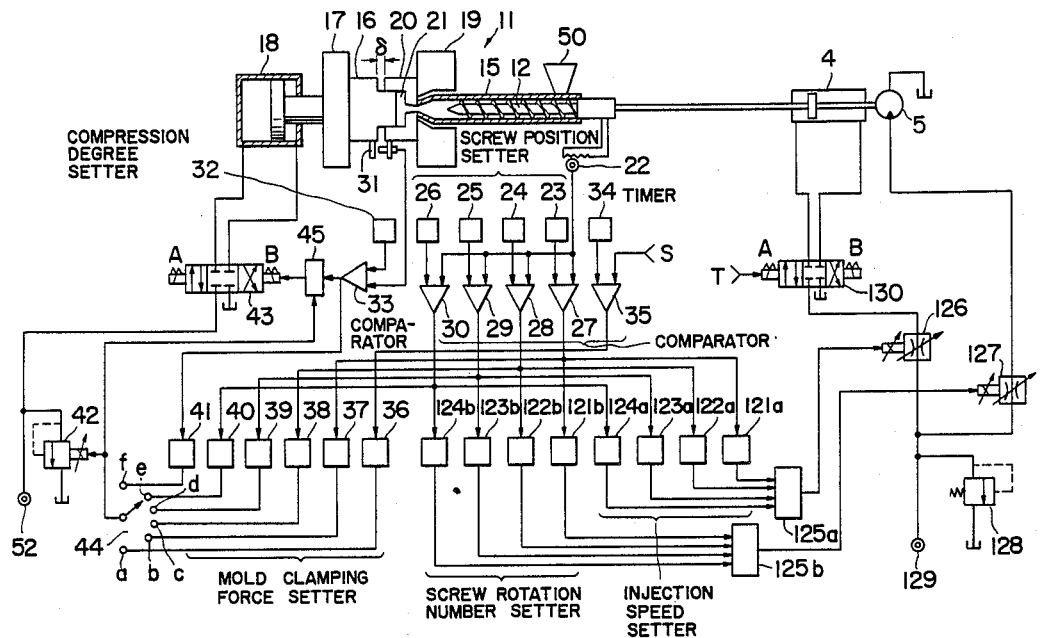

METHOD FOR INJECTION COMPRESSION MOLDING

BACKGROUND OF THE INVENTION

For molding, with an injection molding machine, such products as lenses and discs having a relatively large thickness and required to have precise configurations and small internal strains, an injection molding machine has been used capable of injecting a large quantity of molten material in each shot such that the quantity of the molten material injected into a mold cavity of a metal mold would not be deficient. For this reason, a method and apparatus have been used wherein a movable metal mold is positioned in a stationary metal mold with a small gap or compression clearance left therebetween, molten resin is filled in the mold cavity defined between the movable and stationary metal molds, and then the movable metal mold is advanced to close the gap or reduce to zero the compression clearance. However, this compression movement is started immediately after filling the molten resin into the mold cavity, or a predetermined time after completion of the filling of the molten resin. For this reason, the compression starting time substantially lags the filling starting time with the result that the molten resin injected into the mold cavity solidifies starting from the contact surface between the resin and the metal mold. Accordingly, when the compression is continued under this condition, it is inevitable to create an internal stress in the molded product.

In the prior art method wherein the compression clearance is reduced after filling the molten resin, a large mold clamping force is necessary thus increasing the size of the injection molding machine. Where a molding machine requires a small mold clamping force but it is necessary to increase the quantity of the injected resin per shot, the screw is rotated while being advanced toward the meta mold.

With this method, however, the molten resin is conveyed into the mold cavity only by the transfer force caused by the rotation of the screw so that where the cavity has an intricated configuration, the resin cannot reach deep portions of the cavity. Moreover, as the filling speed of the resin is relatively low, there is the same defect that the resin begins to solidify starting from the contact surface between the filled resin and the metal mold.

SUMMARY OF THE INVENTION

It is an object of this invention to provide an improved method and apparatus capable of preventing creation of the internal strain in the molded product due to a lag of the compression motion of the movable metal mold.

Another object of this invention is to provide an improved method and apparatus capable of manufacturing products of an intricated configuration with an injection molding machine requiring a relatively small mold clamping force.

According to one aspect of this invention there is provided a method of operating an injection compression molding machine comprising a stationary metal mold, a movable metal mold, an oil pressure actuator for advancing the movable metal mold toward the stationary metal mold to form a mold cavity therebetween with a predetermined compression clearance $\delta$ left between the movable and stationary metal molds, a heating cylinder adapted to engage with the stationary metal mold, means for supplying a thermoplastic resin into the heating cylinder, a screw contained in the heating cylinder for injecting molten metal into the mold cavity, means for rotating the screw and means for reciprocating the screw through the heating cylinder, characterized in that the method comprises the steps of filling the molten resin in the mold cavity and strrting advancement of the movable metal mold toward the stationary metal mold when the screw reaches a predetermined set position during an injection stroke so as to reduce the compression clearance $\delta$ and to increase pressure acting upon the molten resin injection into the mold cavity.

According to another aspect of this invention there is provided apparatus for operating an injection compression molding machine comprising a stationary metal mold, a movable metal mold, an oil pressure actuator for advancing the movable metal mold toward the stationary metal mold to form a mold cavity therebetween with a predetermined compression clearance $\delta$ left between the movable and stationary metal molds, a heating cylinder engaging the stationary metal mold, means for supplying a thermoplastic resin into the heating cylinder, a screw contained in the heating cylinder for injecting molten resin into the mold cavity, means for rotating the screw and means for reciprocating the screw in the heating cylinder, characterized in that the apparatus comprises a screw position detector for detecting the axial position of the screw, a plurality of screw position setters respectively setting predetermined screw positions along which the screw is moved, a plurality of comparators respectively comparing the outputs of the screw position setters with the output signal of the screw position detector, a plurality of mold clamping force setters connected to receive output signals of the respective comparators, a transfer switch for selecting one of the outputs of the mold clamping force setters, and an electromagnetic transfer valve energized by the output of the transfer switch through a control device for actuating the oil pressure actuator.

BRIEF DESCRIPTION OF THE DRAWING

In the accompanying drawing a single FIGURE shows an injection molding machine and electric and hydraulic circuits for operating the injection molding machine according to this invention.

DESCRIPTION OF THE PREFERRED EMBODIMENT

Referring now to the accompanying drawing, the compression type injection molding machine 11 embodying the invention comprises a screw 12 reciprocated by an injection cylinder 4 and rotated by an electric or an oil pressure motor 5. The screw 12 is contained in a heating cylinder 15 having a hopper 50 at one end for charging a thermoplastic resin. The injection molding machine further comprises a movable metal mold 16 mounted on a movable plate 17, the movable metal mold being moved toward and away from a stationary metal mold 20 supported by a stationary plate 19 when a mold clamping cylinder 18 is operated so as to engage with the stationary metal mold 20 to define a mold cavity 21. The cavity 21 is defined such that when movable metal mold 16 is inserted into the stationary metal mold 20 a compression clearance or gap $\delta$ would be left therebetween so that the clearance $\delta$ is closed or reduced to zero while the molten resin is filled into the mold cavity. A position detector 22 is provided for detecting an axial position of screw 12, which may be a potentiometer, for example. There are also provided screw position setters 23-26 which are set with any desired screw positions respectively and comparators 27-30 which respectively compare the output of the screw position detector 22 and the outputs of screw position setters 23-26 for producing signals for controlling the screw speed at any one of the set screw positions and the mold clamping force.

There are provided a clearance detector 31 mounted on the movable and stationary metal molds, a compression degree setter 32 which sets a desired clearance $\delta$ and a comparator 33 comparing the output of clearance detector 31 and the set value of the clearance $\delta$. The comparator 33 outputs a signal when the detected value of $\delta$ exceeds the set value of $\delta$. A timer 34 is provided for setting the rotation time of the screw, that is the filling time of the molten resin. A comparator 35 compares the output signal of timer 34 and a signal S representing an interval after start of the rotation of screw 12. There are provided a plurality of mold clamping force setters 36-41 which are respectively inputted with the outputs of comparators 27-30, 33 and 35; a transfer switch 44 having a plurality of stationary contacts a-f which are respectively connected to the output terminals of mold clamping force setters 36-41 and a movable contact which is operated manually to select either one of the stationary contacts a-f or automatically when either one of the mold clamping force setters 36-41 is set.

42 shows an electromagnetic relief valve which relieves a portion of the pressurized oil outputted from an oil pump 52 to supply oil of a constant pressure to the mold clamping cylinder 18 via an electromagnetic transfer valve 43 of the well known construction and controlled by a signal from a controller 45 supplied with the output signals of comparator 33 and transfer switch 44. Thus, the controller 45 controls the electromagnetic transfer valve 43 in accordance with the deviation of clearance $\delta$ and the output of one of the mold compression force setters 36-41, thereby applying an optimum mold clamping force to the movable metal mold 16 during injection of the molten resin.

A plurality of injection speed setters 121a-124a and a plurality of screw rotation number setters 121b-124b are respectively connected in parallel to mold clamping force setters 36-40. In other words, the injection speed setters 121a-124a and screw rotation number setters 121b-124b are supplied with the output signals of comparators 27-30, respectively.

The output signals of injection speed setters 121a-123a are applied to input terminals of an OR gate circuit 125a, while the output signals of screw rotation number setters 121b-124b are supplied to input terminals of another OR gate circuit 125b. The output signals of the OR gate circuits 125a and 125b are respectively supplied to the operating solenoids of electromagnetic throttle valves or flow quantity control valves 126 and 127. A portion of the pressurized oil outputted by an oil pump 129 is relieved by a relief valve 128 so that pressurized oil of a constant pressure is supplied to the oil pressure motor 5 through flow quantity control valve 127 and to injection cylinder 4 through flow quantity control valve 126 and electromagnetic transfer valve 130.

Although in this embodiment, the position of the screw is fixed by oil pressure means such position fixing can also be made with mechanical means.

In operation, when the filling step is completed the screw reaches the forward limit position. Then the metal molds are opened by moving the movable metal mold 16 to the left to take out the molded product. After that, metal molds are partially closed while leaving a predetermined compression clearance $\delta$ therebetween as shown in the drawing. For preparing the next filling step, the molten resin is stored in a space in the heating cylinder 15 in front of screw 12 by rotating the same. Then the screw is retracted by the cylinder 4 while being rotated by oil pressure motor 14. When the screw position detector 22 detects a predetermined screw position, not shown, the signal T is issued so that the electromagnetic transfer valve 130 is moved to position A to block the pressurized oil discharged from the injection cylinder 4. Consequently, the screw 12 continues to rotate at that predetermined position, whereby the molten resin is accumulated in the space in front of the screw for an interval set by the timer 34. After elapse of a time set by the timer 34, the electromagnetic transfer valve 130 is brought to position B to advance the screw 12 by injection cylinder 4 so as to inject the molten resin accumulated in the space in front of the screw into the mold cavity 21 under a high pressure. As the screw reaches a predetermined position, for example a position set by screw position setter 26, and during the injection stroke the mold clamping cylinder 18 is actuated to clamp together the stationary and movable metal molds 20 and 16 so as to decrease the clearance $\delta$.

With the method and apparatus of this invention, at the time of compression molding, the stationary and movable metal molds are closed with a predetermined compression clearance $\delta$ left therebetween, and the molten resin is filled in the mold cavity by the rotation of the screw 12 or by a combination of the rotation and the advancement of the screw. Consequently, the problem of insufficient quantity of the injected resin at each shot and the problem of creating internal stress can be solved. Moreover, it is possible to increase the injected quantity by using an injection molding machine of a relatively small capacity.

What is claimed is:

1. A method of operating an injection compression molding machine comprising a stationary metal mold, a movable metal mold, an oil pressure actuator for advancing said movable metal mold toward said stationary metal mold to form a mold cavity therebetween with a predetermined compression clearance $\delta$ left between said movable and stationary metal molds, a heating cylinder adapted to engage with said stationary metal mold, means for supplying a thermoplastic resin into said heating cylinder, a screw contained in said heating cylinder for injecting molten resin into said mold cavity, means for rotating said screw, and means for reciprocating said screw through said heating cylinder, said method comprising the steps of:

advancing said movable metal mold toward said stationary metal mold to form the mold cavity therebetween with the predetermined compression clearance $\delta$ left between said movable and stationary metal molds;

filling said molten resin in said mold cavity by advancing said screw in an injection stroke;

detecting positions of said advancing injection screw; and starting advancement of said movable metal mold toward said stationary metal mold for compression molding when said screw reaches a predetermined set position during said injection stroke and before the screw has completed its stroke so as to partially reduce said compression clearance $\delta$ and to increase pressure acting upon said molten resin injected into said mold cavity.

2. The method according to claim 1 further comprising the step of advancing said movable mold when said compression clearance $\delta$ deviates from a predetermined value but before said screw reaches said predetermined set position.

3. The method according to claim 1 wherein said advancement of said screw is started by a timing completion signal issued by a timer which starts to operate when said screw reaches a predetermined retracted position.

4. A method of operating an injection compression molding machine comprising a stationary metal mold, a movable metal mold, an oil pressure actuator for advancing said movable metal mold toward said stationary metal mold to form a mold cavity therebetweeen with a predetermined compression clearance $\delta$ left between said movable and stationary metal molds, a heating cylinder adapted to engage with said stationary metal mold, means for supplying a thermoplastic resin into said heating cylinder, a screw contained in said heating cylinder for injecting molten resin into said mold cavity, means for rotating said screw, and means for reciprocating said screw through said heating cylinder, said method comprising the steps of:

advancing said movable metal mold toward said stationary metal mold to form said mold cavity therebetween with the predetermined compression clearance $\delta$ left between said movable and stationary metal mold accumulating molten resin in a space in said heating cylinder in front of said screw by rotating said screw;

injecting said accumulated molten resin into said mold cavity by rotating said screw by advancing said screw in an injection stroke; detecting positions of said advancing injection screw; and advancing said movable metal mold toward said stationary metal mold for compression molding and to partially reduce said compression clearance $\delta$ and to increase pressure applied to said molten resin injected into said mold cavity when said screw reaches a predetermined set position during said injection stroke and before the screw has completed its stroke.

5. The method according to claim 4 wherein advancement of said screw is started at a predetermined time after said screw reaches a predetermined retracted position.

6. The method according to claim 4 further comprising the step of advancing said movable mold when said compression clearance is caused to increase by said molten resin injected into said mold cavity but before said screw reaches said predetermined set position.

* * * * *